United States Patent [19]

Mehregany et al.

[11] Patent Number: 6,029,337
[45] Date of Patent: Feb. 29, 2000

[54] METHODS OF FABRICATING MICROMOTORS WITH UTILITARIAN FEATURES

[75] Inventors: Mehran Mehregany, Pepper Pike; Francis Lawrence Merat, University Heights, both of Ohio

[73] Assignee: Case Western Reserve University, Cleveland, Ohio

[21] Appl. No.: 08/783,021

[22] Filed: Jan. 14, 1997

Related U.S. Application Data

[63] Continuation of application No. 08/259,079, Jun. 10, 1994, abandoned, which is a continuation-in-part of application No. 08/254,920, Jun. 6, 1994, Pat. No. 5,705,318.

[51] Int. Cl.$^7$ ................................................ H02K 15/04
[52] U.S. Cl. ...................... 29/598; 29/424; 310/40 MM; 430/312; 430/319
[58] Field of Search ............. 29/598, 424; 310/40 MM, 310/42; 427/128–132; 430/312, 319

[56] References Cited

U.S. PATENT DOCUMENTS

| | | | |
|---|---|---|---|
| 4,528,071 | 7/1985 | Glaushauser | 204/11 |
| 4,579,616 | 4/1986 | Windischmann et al. | 156/160 |
| 4,677,042 | 6/1987 | Kato et al. | 430/5 |
| 4,708,919 | 11/1987 | Shimkunas et al. | 430/5 |
| 4,738,010 | 4/1988 | Enrfeld et al. | 29/149.5 |
| 4,797,211 | 1/1989 | Ehrfeld et al. | 210/321.84 |
| 4,821,997 | 4/1989 | Zdeblick | 251/11 |
| 4,824,073 | 4/1989 | Zdeblick | 251/11 |
| 4,897,360 | 1/1990 | Guckel et al. | 437/7 |
| 4,923,772 | 5/1990 | Kirch et al. | 430/5 |
| 4,943,032 | 7/1990 | Zdeblick | 251/11 |
| 4,943,750 | 7/1990 | Howe et al. | 310/309 |
| 4,966,646 | 10/1990 | Zdeblick | 156/633 |
| 4,996,082 | 2/1991 | Guckel et al. | 427/99 |
| 5,013,693 | 5/1991 | Guckel et al. | 437/248 |
| 5,043,043 | 8/1991 | Howe et al. | 156/645 |
| 5,045,439 | 9/1991 | Maner et al. | 430/394 |
| 5,066,533 | 11/1991 | America et al. | 428/156 |

(List continued on next page.)

FOREIGN PATENT DOCUMENTS

| | | |
|---|---|---|
| 510629 | 10/1992 | European Pat. Off. . |
| 592094 | 4/1994 | European Pat. Off. . |
| 4-1560508 | 5/1992 | Japan . |
| 4-328715 | 11/1992 | Japan . |
| 5-142405 | 6/1993 | Japan . |
| 6-054555 | 2/1994 | Japan . |

OTHER PUBLICATIONS

Deng et al., "Outer–rotor Polysilicon Wobble Micromotors," *Proceedings IEEE Micro Electro Mechanical Systems An Investigation of Micro Structures, Sensors, Actuators, Machines and Robotic Systems*, Jan. 25–28, 1994, pp. 269–272.

Jerman, "Electrically–Activated, Normally–Closed Diaphragm Valves," *Transducers '91, Digest of Technical Papers*, 1991 International Conference on Solid–State Sensors and Actuators, pp. 1045–1048.

Jerman, Electrically–Activated, Micromachines Diaphragm Valves, *Technical Digest*, IEEE Solid–State Sensor Workshop, 1990, pp. 65–69.

(List continued on next page.)

*Primary Examiner*—Carl E. Hall
*Attorney, Agent, or Firm*—Fay, Sharpe, Beall, Fagan, Minnich & McKee

[57] ABSTRACT

Micromotors are fabricated with utilitarian features on their rotors. In some embodiments, the features are formed by the molded addition of material on top of a rotor surface. In other embodiments, the features are formed by the provision of an additional layer on top of the rotor, and the selective removal of material therefrom. In yet other embodiments, the features are defined by the selective removal of material from the rotor itself. The disclosure is particularly illustrated with reference to the fabrication of a polygon (nickel) mirror on a polysilicon, electrostatic micromotor rotor for use in scanning applications. However, the principles of the invention can likewise be applied to fabrication of a variety of other features, such as optical gratings, shutters, mechanical actuators, pump impellers and fins, and to a variety of different micromotor constructions.

19 Claims, 12 Drawing Sheets

U.S. PATENT DOCUMENTS

| | | | |
|---|---|---|---|
| 5,069,419 | 12/1991 | Jerman | 251/11 |
| 5,093,594 | 3/1992 | Mehregany | 310/82 |
| 5,162,078 | 11/1992 | Bley et al. | 205/75 |
| 5,185,056 | 2/1993 | Fuentes et al. | 156/639 |
| 5,189,777 | 3/1993 | Guckel et al. | 29/424 |
| 5,190,637 | 3/1993 | Guckel | 205/118 |
| 5,206,983 | 5/1993 | Guckel et al. | 29/598 |
| 5,260,175 | 11/1993 | Kowanz et al. | 430/326 |
| 5,270,125 | 12/1993 | America et al. | 428/698 |
| 5,296,775 | 3/1994 | Cronin et al. | 310/309 |
| 5,298,367 | 3/1994 | Hoessel et al. | 430/326 |
| 5,334,467 | 8/1994 | Cronin et al. | 430/5 |
| 5,342,737 | 8/1994 | Georger, Jr. et al. | 430/324 |
| 5,350,499 | 9/1994 | Shibaike et al. | 204/192.34 |
| 5,376,506 | 12/1994 | Ehrfeld et al. | 430/321 |
| 5,378,583 | 1/1995 | Guckel et al. | 430/325 |

OTHER PUBLICATIONS

Long–Sheng Fan et al., "Integrated Movable Micromechanical Structures for Sensors and Actuators," *IEEE Transactions on Electron Device,* vol. 35, No. 6, Jun. 1988, pp. 724–730.

Bryzek et al., "Micromachines on the March," *IEEE Spectrum,* May 1994, pp. 20–31.

Furuhata et al., "Outer Rotor Surface–Micromachines Wobble Micromotor," *IEEE Micro Electro Mechanical Systems,* Feb. 1993, pp. 161–1666.

Folta et al., "Design, Fabrication and Testing of a Miniature Peristaltic Membrane Pump," *IEEE,* 1992, pp. 186–189.

Deng et al., "A Simple Fabrication Process for Side–Drive Micromotors," 7th International Conference on Solid–State Sensors and Actuators, Digest of Technical Papers, Jun. 1993, pp. 756–759.

Zdeblick et al., "A Microminature Electric–to–Fluidic Valve," *Wescon '87 Proceedings,* p. 24/4/1–2, Nov. 18, 1987.

Van De Pol, et al., "A Thermopneumatic Micropump Based on Micro–Engineering Techniques," *Elsevier Sequoia,* Printed in The Netherlands, 1990, pp. 198–202.

☐ Silicon  ▨ Polysilicon  ☐ LTO  ■ Nickel

☒ Silicon  ▧ Polysilicon  ☐ LTO
▧ Photoresist  ■ Nickel

METHODS OF FABRICATING MICROMOTORS WITH UTILITARIAN FEATURES

RELATED APPLICATION DATA

This application is a continuation of application Ser. No. 08/259,079, filed on Jun. 10, 1994 now abandoned, which is a continuation-in-part of application Ser. No. 08/254,920, filed on Jun. 6, 1994, now U.S. Pat. No. 5,705,318.

FIELD OF THE INVENTION

The present invention relates to micromotors, and more particularly relates to the fabrication of features on micromotor rotors wherein the rotors serve as prime movers.

BACKGROUND AND SUMMARY OF THE INVENTION

Applicants' copending application, cited above and attached hereto as an Appendix, reviews various work in the field of micromotor design and fabrication, and discloses a number of important improvements thereto.

The present application is directed to further improvements in micromachine technology, particularly to the design and fabrication of micromotors wherein the rotors are provided with working features (i.e. mirrors, gratings, fins, pump impellers, optical shutters, etc.) that are driven by the micromotor.

The present application is illustrated with reference to a particular application, namely the provision of mirrors on a micromotor rotor so as to enable micromachined optical scanning. While this is one important application of the disclosed technology, it should be recognized that the invention is not so limited. Instead, the invention finds application whenever the rotor of a micromotor is to be used as a prime mover in a system. (By prime mover, applicants mean that the rotor directly moves an element that performs the ultimate work of a given assembly. This is in contrast to use of a rotor simply to actuate a further assembly (as by intermeshed gears) wherein an element in that further assembly serves as the prime mover.)

In accordance with one embodiment of the present invention, a micromotor is fabricated using the same general process detailed in the Appendix. However, before the rotor release step, a thick layer of photoresist is applied and exposed to define areas on the rotor where metal features (e.g. nickel mirrors) are to be attached. The substrate is then developed to remove the photoresist from the defined areas, leaving mold cavities. Electroless-plating is performed, filling the mold cavities with metal. The molding photoresist is thereafter removed, leaving metal plate structures extending from the rotor.

More generally, micromotors according to the present invention are fabricated with utilitarian features on their rotors. In some embodiments, the features are formed by the molded addition of material on top of a rotor surface. In other embodiments, the features are formed by the provision of an additional layer on top of the rotor, and the selective removal of material therefrom. In yet other embodiments, the features are defined by the selective removal of material from the rotor itself.

While illustrated with reference to polysilicon surface micromachined electrostatic motors, the invention finds applicability to all manner of micromachinery, including electromagnetic devices, and devices based on other structural materials and fabrication technologies.

The foregoing and additional features and advantages of the present invention will be more readily apparent from the following detailed description, which proceeds with reference to the accompanying drawings.

DETAILED DESCRIPTION

The present invention is illustrated with reference to an exemplary application, namely the fabrication of mirrors on a micromotor rotor. However, as detailed below, the invention finds a great variety of diverse applications.

Microscanners

The development of polysilicon micromotors for optical scanning applications is a good match between the small size and low cost of batch fabricated micromotors, and the low-load requirements imposed by optical elements such as polygon mirrors. Typical optical scanners (e.g. supermarket scanners) are large, complex systems requiring careful alignment. A micromechanical scanner implementation reduces the weight and size of existing scanners by two orders of magnitude with significant decrease in cost due to batch fabrication.

Figure 1:
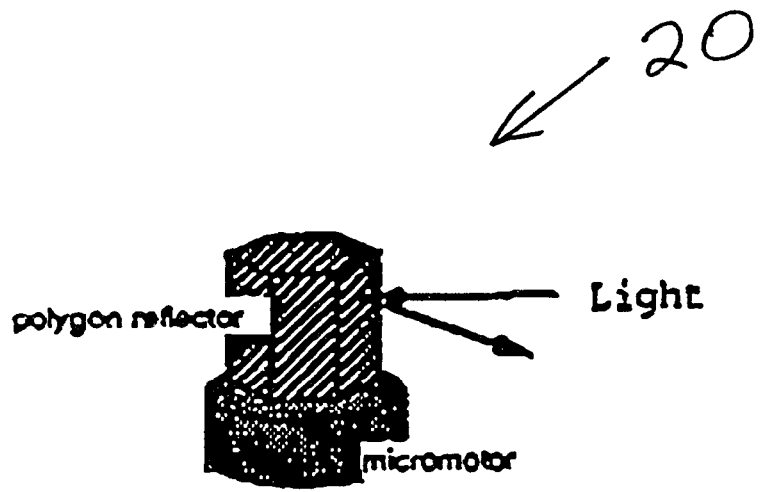
FIG. 1 is a schematic drawing of a rotating polygon scanner with optically reflective rotor segments, in accordance with one embodiment of the present invention.
Figure 2:
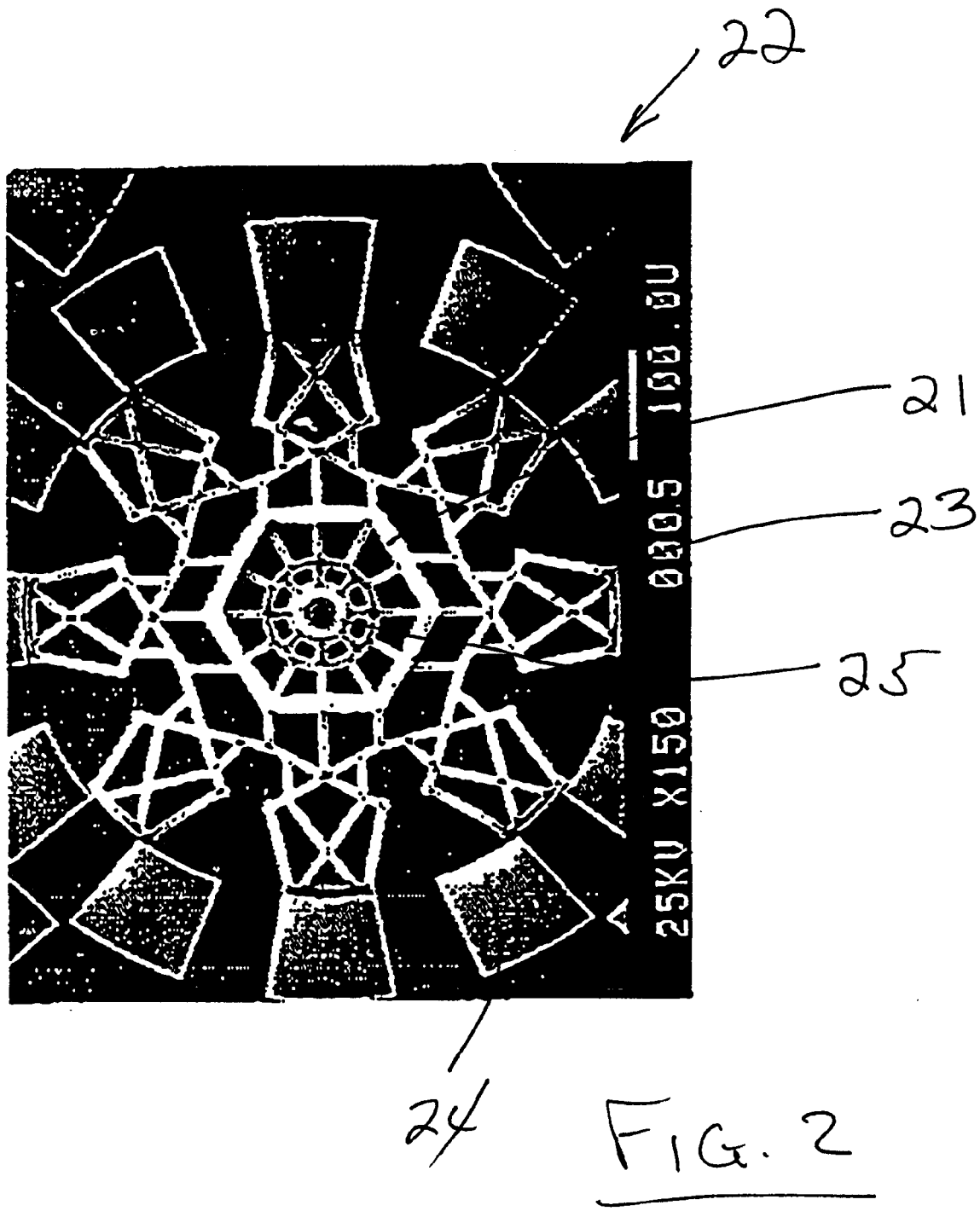
FIG. 2 is an illustration of an optical microscanner fabricated by electroless-plating of nickel reflecting surfaces on the rotor of a salient-pole micromotor, in accordance with one embodiment of the present invention.
Figure 3:
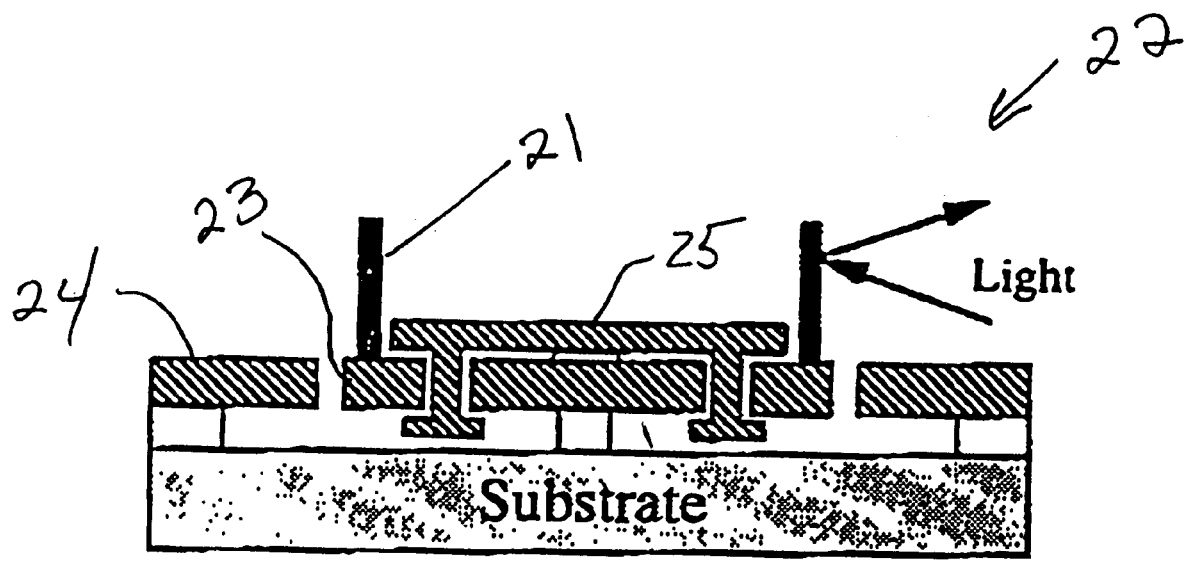
FIG. 3 is a sectional view (not to scale) of the microscanner of FIG. 2 after release, showing illumination of the nickel surface with a light beam.

In the following discussion, we address two types of microscanners based on polysilicon micromotors: a micromotor polygon scanner and a micromotor grating scanner. FIG. 1 is a schematic drawing of a polygon scanner 20 with optically reflective rotor segments. FIGS. 2 and 3 show a microscanner 21 fabricated on a rotor 23 of a salient-pole micromotor 22, and a cross-sectional view of same. (The rotor 23 is fabricated in perforated/spoked fashion to facilitate its quick release. The depicted spokes have a width of 10 to 15 microns, as compared with the substantially larger dimensions of the rotor itself. Also shown in FIGS. 2 and 3 are the stator poles 24, and the bearing 25.)

The polygon scanner can scan in a straight line in a plane, but requires high-aspect-ratio fabrication of metallic microstructures for the reflective surfaces and careful optical design in order to efficiently transmit optical radiation through small dimensions of the microstructure. A polygon scanner such as described herein can also be used for inexpensive optical switches.

The micromotor shown in FIGS. 2 and 3 has a 0.5 millimeter out rotor diameter. The thickness of the nickel is 20 microns and the width of the nickel lines is 10 microns.

Figure 4:
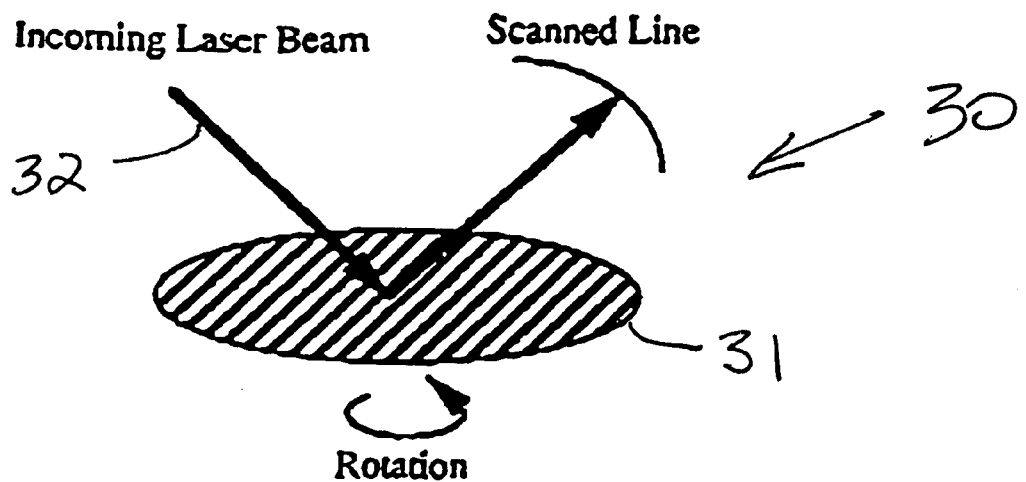
FIG. 4 is a schematic drawing showing the concept of a micromotor grating scanner in the reflection mode.

A micromotor grating scanner is similar to the foregoing but replaces the plated optical element with a diffractive element. FIG. 4 is a schematic drawing of a micromotor grating scanner 30. The source illumination 32 comes from out of the plane of the substrate 31 and can be perpendicular to the plane of the substrate depending upon the application.

Depending on the optical wavelength and the substrate material, a rotating grating scanner 30 is capable of being operated in either the transmission mode or reflection mode. Because the optical source can be perpendicular to the substrate plane 31 and the grating structure will be of millimeter dimensions, the optical design is not as complex as that for the micromotor polygon scanner. In addition, arrays of gratings rotated by synchronized micromotors are capable of scanning large diameter optical beams (larger than 1 millimeter).

In general, the micromotor polygon scanner scans in a straight line in a plane, and the micromotor grating scanner scans in a curved line out of the plane of the grating. The former requires high-aspect-ratio optical elements to limit diffraction losses, and the source must lie in the same plane. This also poses strict requirements on the optical source in terms of efficiently coupling the optical energy to the reflecting elements of the polygon. The most promising sources are optical fibers or integrated optical waveguides.

The grating scanner requires well-defined grating lines and precise control of the grating depth during fabrication. However, coupling the optical energy to the grating is relatively simple. Processing of a grating scanner for transmission mode requires that the substrate be transparent to the optical radiation. For expository convenience, we focus the following discussion on fabrication of polygon scanners. Artisans will recognize that the same principles can be used to realize grating scanners.

Fabrication of the Microscanners

The microscanner structures described herein are based on the development of millimeter-sized polysilicon micromotors and the integration of a high-aspect-ratio electroless nickel plating process with polysilicon surface micromachining to fabricate the optical elements.

Millimeter-Sized Polysilicon Micromotor

Figure 5:
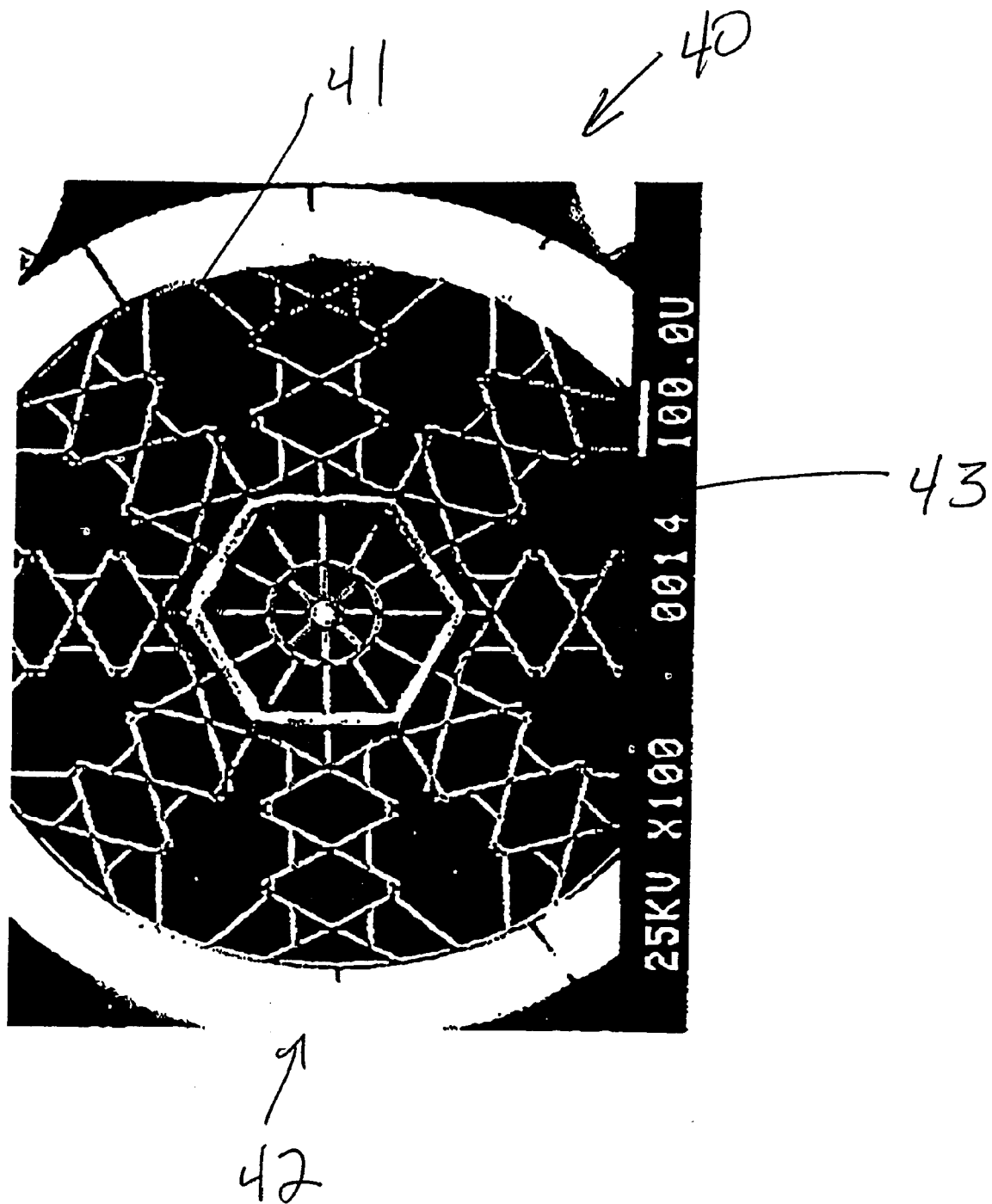
FIG. 5 is an illustration of an optical microscanner made by electroless-plating of nickel reflecting surfaces on the rotor of a wobble micromotor, in accordance with one embodiment of the present invention.

In order to support optical elements large enough to have acceptable diffraction losses, we developed large diameter (up to one millimeter) micromotors. FIG. 5 shows a microscanner 40 fabricated on the rotor 41 of a 1.0 mm-diameter wobble micromotor 42. In our work, typical motor dimensions are rotor diameters of 0.5 to 1.0 millimeters, rotor/stator gaps of 1.5 to 2.5 microns, and rotor/stator thicknesses of 5 microns. Again, the thickness of the nickel plating 43 defining the mirror is 20 microns and the width of the nickel is 10 microns.

Figure 6:
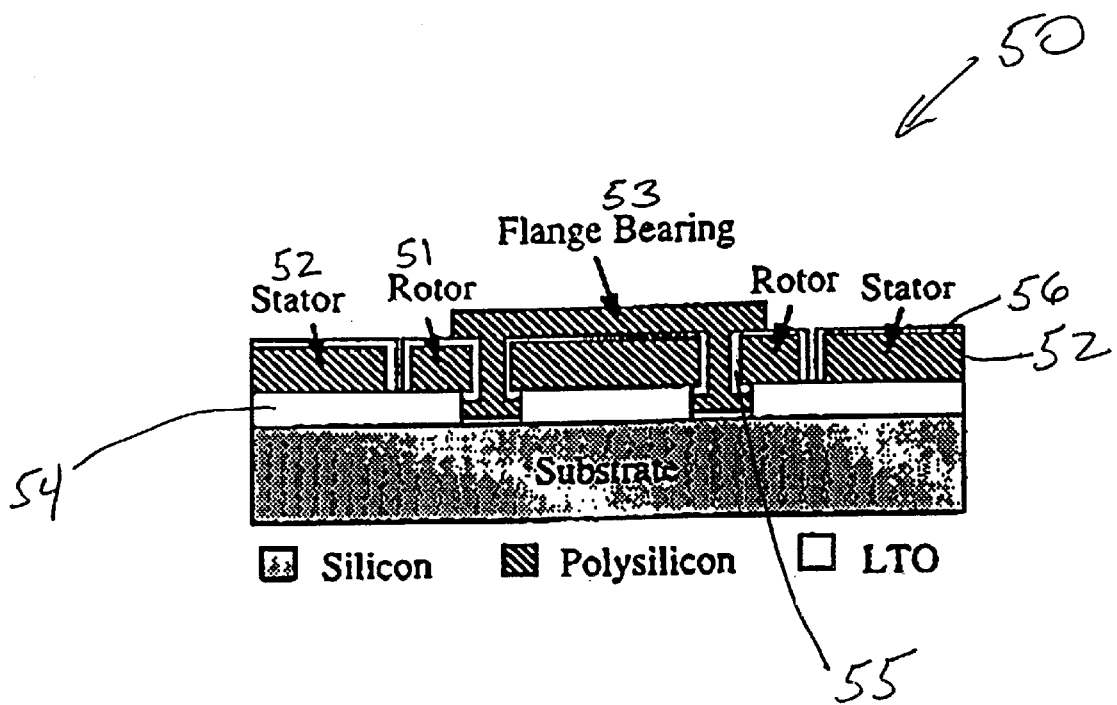
FIG. 6 is a sectional view (not to scale) of a micromotor according to one embodiment of the present invention during its fabrication.

FIG. 6 presents a cross-sectional schematic of a millimeter-sized micromotor 50 before release. Millimeter-sized motors were fabricated using the rapid prototyping process described in the Appendix, resulting in flange bearing wobble and salient-pole motors. The rotor 51, stator 52, and bearing 53 were fabricated from a 5 micron-thick phosphorous-doped polysilicon film. A 2.4 micron-thick low temperature oxidation (LTO) film 54 is used for substrate/stator isolation, as well as the sacrificial layer under the rotor. The bearing clearance 55 is created by a 0.5 micron thermal oxidation layer 56.

Fabrication of the Reflector

A high-aspect-ratio lithography process is used in conjunction with an electroless nickel plating process to fabricate the polygon reflectors 57 on the rotor of the polysilicon micromotor 50 prior to release. Of key importance is the compatibility of the reflector fabrication process with that of the micromotor process, in particular during the release step. Additionally, a large area smooth reflective surface is desired.

Figures 7A, 7B, 7C:
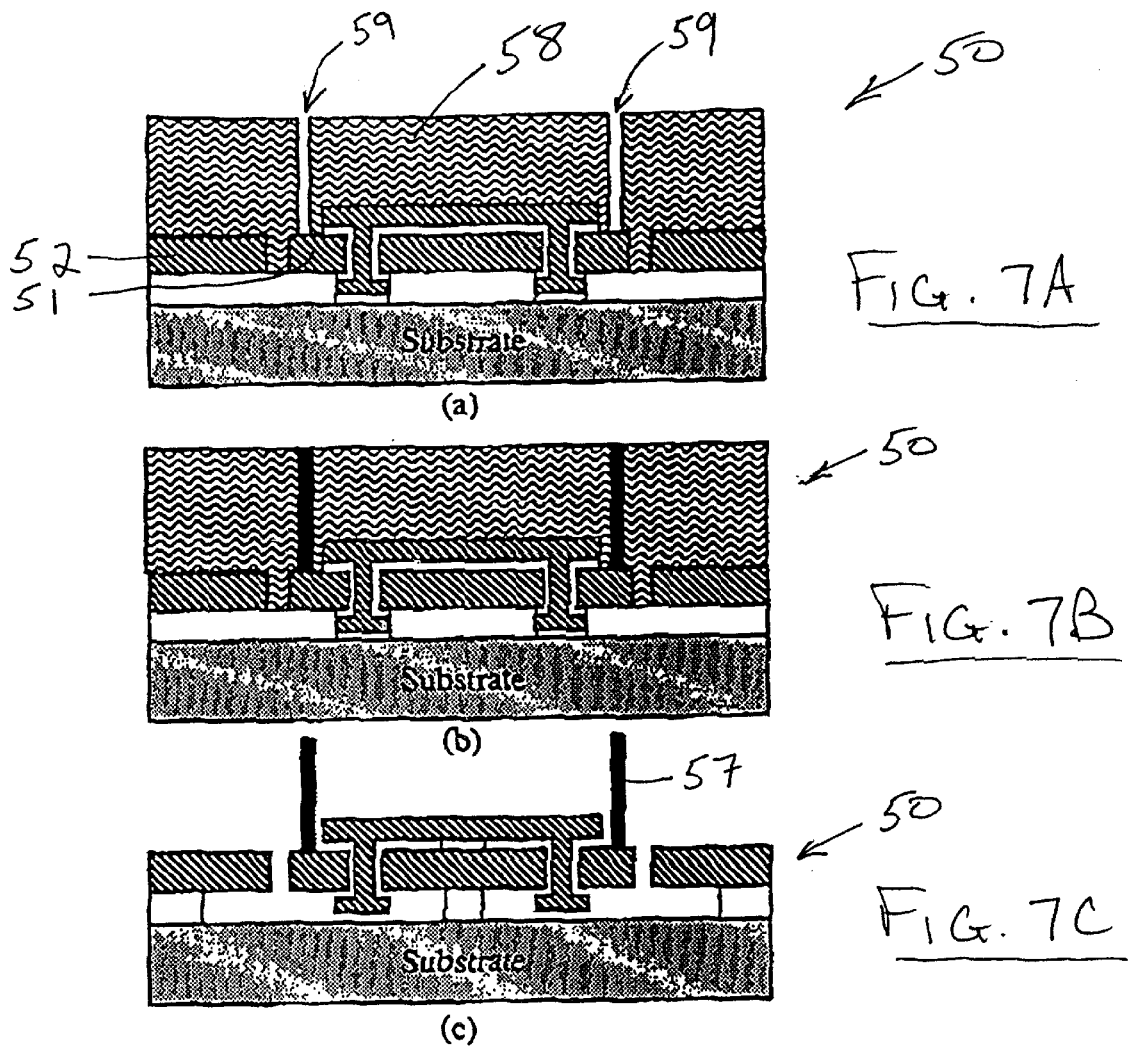
FIGS. 7A–7C are sectional views depicting further fabrication steps of the micromotor shown in FIG. 6.

FIGS. 7A–7C further detail the reflector fabrication process. After the motor is fabricated (FIG. 6), the oxide layer 56 on top of the rotor 51 and stator 52 is removed in BHF. A thick (up to 23 microns) photoresist layer 58 is then spun cast and photolithographically patterned to define mold voids 59 for plating (FIG. 7A). Electroless plating of nickel is then performed (FIG. 7B), and the photoresist mold 58 is removed. A 10 minute hydrofluoric acid (HF) bath performs the final release, freeing the rotor and underetching to form the anchors (FIG. 7C). The release process does not alter the reflective properties of the nickel structures in our work.

In the photolithography process for the plating mold (FIG. 7A), large heights, smooth vertical sidewalls and material compatibility with the electroless plating chemicals were required. Our photolithography process used a positive photoresist 58 of high transparency and high viscosity with multiple coats to obtain these photoresist films and planarized surfaces. The softbase, exposure, and development conditions were controlled to obtain near vertical sidewalls. A standard high pressure mercury ultraviolet source is used for exposure. In the illustrated embodiment, the thickness of the photoresist 58 is 23 microns; the mold opening has a width of 7 microns.

Before plating, the polysilicon surface on which the features (mirrors) are to be formed is pretreated. In our work, this pretreatment includes: (a) a 45 second etch in a solution of $HNO_3$, HF, and $H_2O$; (b) a nine minute deposition of Pd as a starting catalyst from a solution of $PdCl_2$, $SnCl_2$, and HCl; (c) −15 second in HCl to remove the Sn oxide complex; and (d) a two minute rinse in deionized water. In (a) etching of the polysilicon surface takes place, which has been determined to be important for the uniformity of the plating process and for adhesion. The adhesion force between nickel and polysilicon seems to be primarily mechanical (not chemical) in nature. The etch rate and surface morphology vary depending on the polysilicon grain size which is, in turn, affected by the LPCVD deposition conditions, as well as subsequent thermal treatment. For short etch times, plating will not be initiated uniformly. For long times, the polysilicon film thickness is reduced significantly, affecting the mechanical integrity of the rotor.

After the surface treatment step, electroless plating is carried out in a mixture of $NiSO_4$, $NaH_2PO_2$ (as reducing agent), and $CH_3COONa$ (as a buffer and mild complexing agent for Ni). A fresh plating solution is used for each batch to keep the nickel concentration constant and to avoid contamination from the solution itself, photoresist, and/or substrate. In the illustrated embodiment, electroless plating on polysilicon is conducted at 90° C. in an electroless plating solution with a pH of 5. In this embodiment, the thickness of the nickel is 20 microns. The polygon beam width is 7 microns.

Polysilicon Microscanners

Preliminary Mechanical Measurements

The microscanners fabricated from millimeter-sized motors operate smoothly and reproducibly in room air for extended periods (e.g., several months) after release. Minimum voltages can be as low as 12 V, while maximum rotor speeds have been 100 rpm for microscanners fabricated on millimeter-sized wobble motors and 2500 rpm for those fabricated on millimeter-sized salient-pole motors. These large motors have motive torques over an order of magnitude larger than previously reported polysilicon micromotors.

Figure 8:
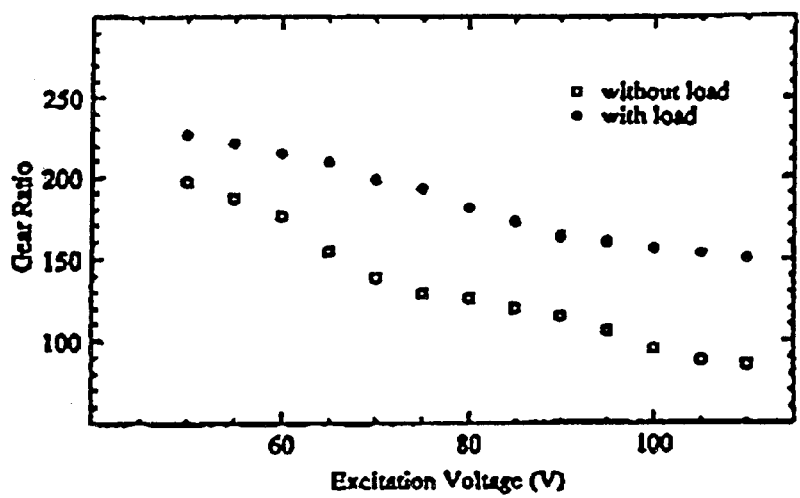
FIG. 8 is a chart depicting gear ratio versus excitation voltage for a micromotor fabricated according to one embodiment of the present invention, with and without load applied.

FIG. 8 presents typical experimental gear ratios as a function of excitation voltage for loaded (e.g., nickel plated) and unloaded (e.g. unplated) wobble motors. As expected, the gear ratio increases with increased load since the load increases friction at the flange contact by increasing the normal contact force. The increased flange friction leads to increased rotor slip. The load is estimated near 72 $\mu$N using pure nickel density of 8.9 g/cm$^3$. The increase in the gear ratio at the smaller excitation voltages (and hence smaller motive torques) is due to increased rotor slip as well.

Figure 9:
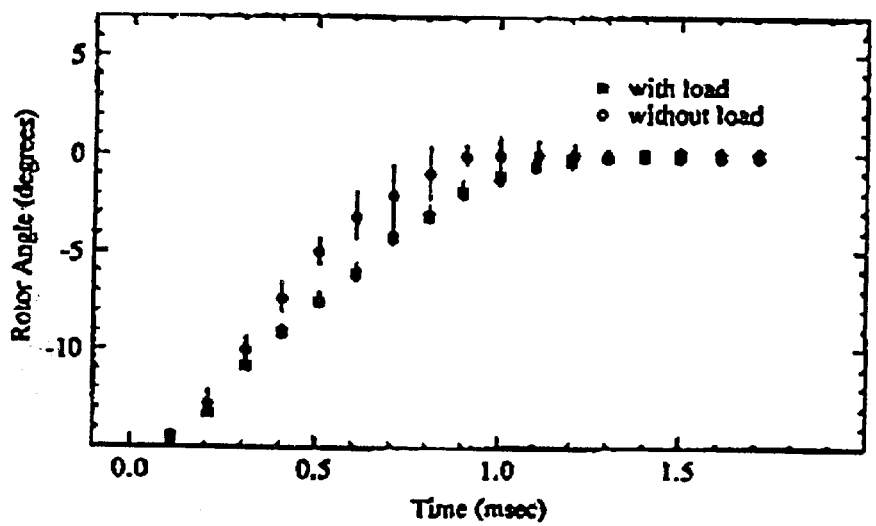
FIG. 9 is a chart depicting step transient data for salient-pole micromotors fabricated according to one embodiment of the present invention, with and without load applied.

FIG. 9 presents typical step transient data for salient-pole motors with load and without load. Stroboscopic dynamometry is used to measure the step response of the motors. The step response is overdamped for these motors due to the increased viscous drag caused by the larger rotor as compared to our previous micromotors. The rise time of the step response is one order of magnitude larger than that for our previous micromotors which are one-tenth the size of these motors. As expected, the step response of the motor with load is slower due to the increased inertia and friction.

Preliminary Optical Measurements

Figure 10:
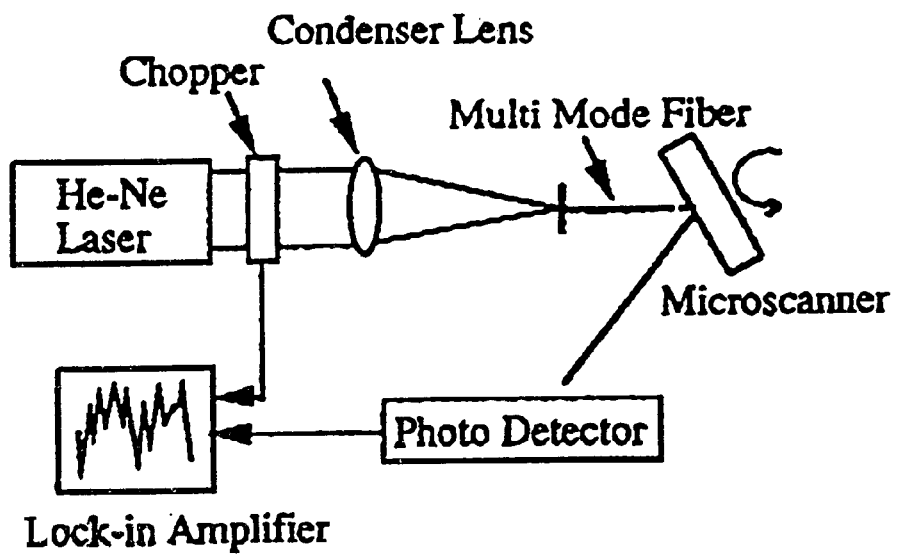
FIG. 10 depicts instrumentation used for optical measurement on microscanners fabricated according to one embodiment of the present invention.

We have performed preliminary optical testing of the microscanners using a 633 nm He-Ne laser coupled into a multi-mode optical fiber. The core of the optical fiber is 20 microns in diameter and the cladding thickness is 125 microns. The laser beam is mechanically chopped to facilitate subsequent optical detection. The optical fiber is positioned approximately in the plane of the substrate 1.5 millimeters from the axis of rotation of the motor. The scanned optical radiation is detected using a photo detector (Milles Griot #13 DSI 007). Absolute power measurements have not yet been performed to determine the optical efficiency of the microscanners. FIG. 10 presents a schematic diagram of the instrumentation for optical measurements on the microscanners.

Figure 11A:
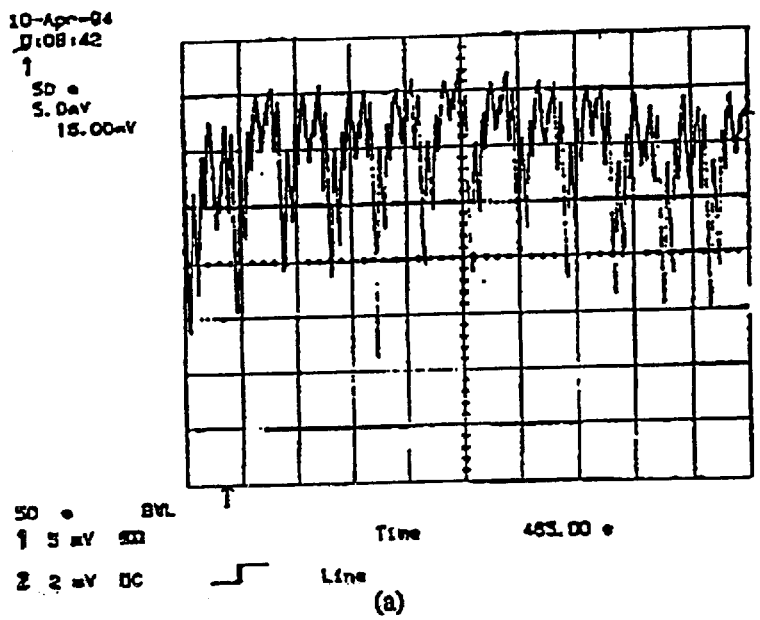
FIGS. 11A and 11B are graphs of detected optical radiation from a rotating polygon scanner for: (A) a 0.5 mm-diameter rotor with constant rotation speed; and (B) a 1.0 mm-diameter rotor with different operating rotor speeds during measurement.
Figure 11B:
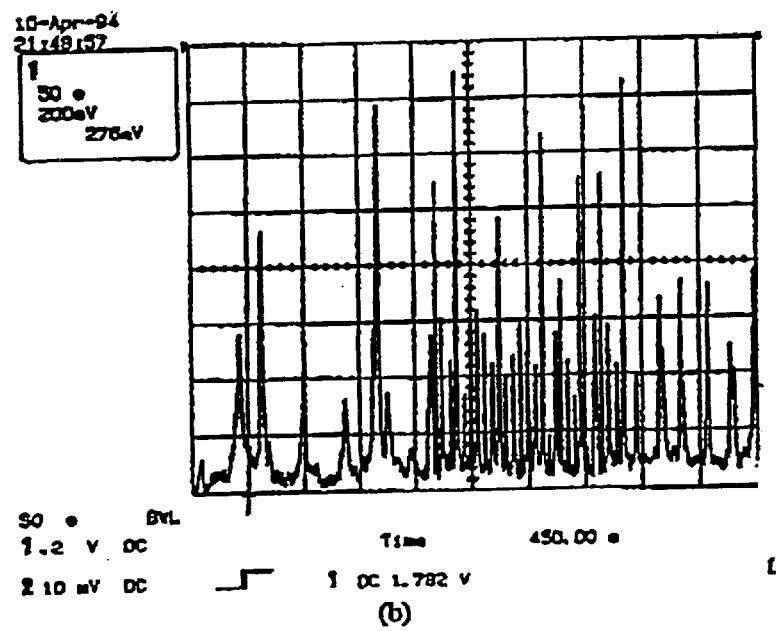
Figure 12:
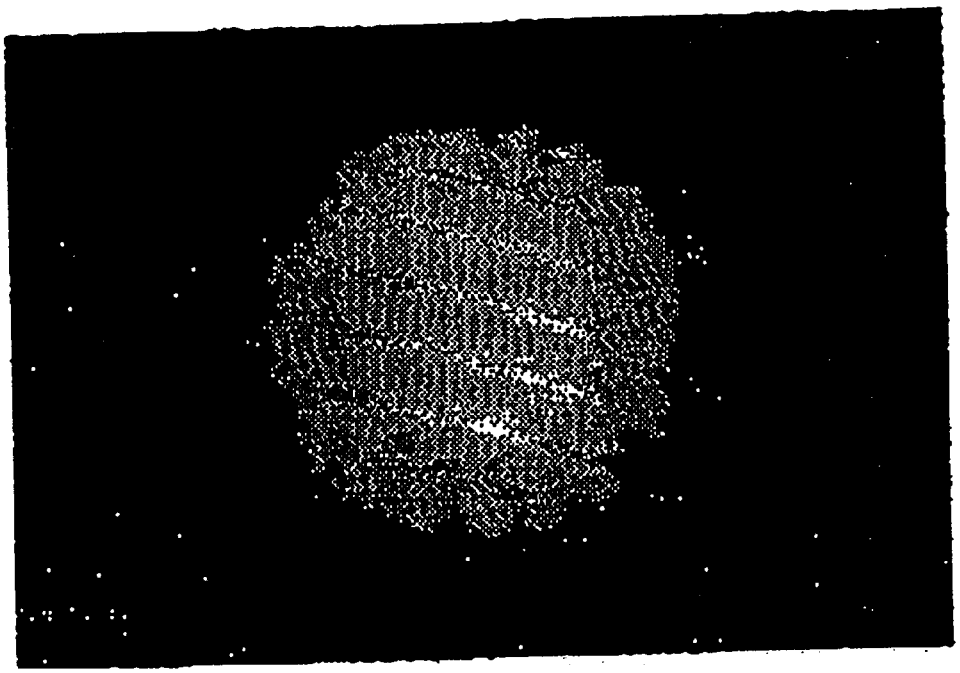
FIG. 12 is an optical radiation pattern resulting from a rotating polygon scanner in accordance with one embodiment of the present invention.

FIGS. 11A and 11B show the detected radiation reflected by microscanners fabricated on wobble micromotors. The diffraction pattern of the scanned radiation is repeatable. The intensity variation in the scanned radiation may be due to wobbling of the micromotor on its rotational axis. The potential of the micromotor scanner is most clearly seen in FIG. 12 which is a digitized photo of a laser beam reflected from the microscanner. The image is captured using a common camcorder with a macro lens approximately in the plane of the scanner and about six inches from the micromotor. The diffraction pattern is observed in FIG. 14.

Discussion

Our results clearly demonstrate the ability of the micromotors to rotate optical elements capable of directing laser beams. However, polygon reflectors which are much taller, i.e. on the order of 100–300 microns are more desirable. Such structures can be implemented by the LIGA process. Structures of this size entail additional weight and friction, but these considerations can readily be dealt with by artisans in the field.

The optical scanners described herein have the polygon reflectors located a considerable distance from the outer dimensions of the rotor. Such arrangements are not usually efficient for coupling the source radiation to the reflector for either scanning or switching applications. A better mode is to place the reflecting surfaces near the outer rotor of the micromotor. For optical switching applications, the source and detected radiation can be transmitted through optical waveguides fabricated on the substrate, dramatically improving the optical efficiency of the device.

Additional information on electroless plating of metals in micromachinery can be found in Furukawa et al, "Electroless Plating of Metals for Micromechanical Structures," Proc. 7th Int. Conf. Solid-State Sensors and Actuators, June, 1993, pp. 66–69.

Alternative Embodiments

Having described and illustrated the principles of our invention with reference to illustrative embodiments and methods, and several variations thereof, it should be apparent that the disclosed embodiments and methods can be modified in arrangement and detail without departing from such principles. For example, while the detailed embodiment defined the utilitarian features on the rotor by the addition of molded material thereon, in other embodiments the utilitarian features can be provided by providing a further layer on top of the rotor and selectively removing portions therefrom. For example, a film (which can be an insulator, a metal, polysilicon, or silicon carbide, to name but a few) can be deposited on top of the rotor. The thickness of the film depends on the particular application. Optical gratings may require a thickness of a few thousand Angstroms; fluid pumping elements may require a thickness of tens or hundreds of microns. Photoresist is then applied to the top of the film and exposed through a mask defining a desired pattern. After developing, the exposed photoresist is removed, and the substrate etched to remove the film thereby exposed. After etching, the remaining photoresist is removed, leaving the patterned film on top of the rotor to serve its utilitarian function.

Still further, the utilitarian features can be defined not just by the addition of material on top of the rotor, but alternatively by the removal of part of the top surface of the rotor itself. Grooves, gratings, shutters, blades and fins can thereby be provided, limited only by the thickness of the rotor and electrostatic operational constraints. Indeed, in some applications, the removal of material can extend all the way through the rotor, resulting in shaped utilitarian perforations therethrough.

It is generally preferred to define the utilitarian features before the rotor is released, regardless of which of the foregoing approaches is used.

While the detailed embodiment involved the provision of utilitarian features on an inner-rotor micromotor, it will be recognized that the same principles can be applied to other micromotor designs, such as outer-rotor micromotors. Further, while the invention has been illustrated with reference to polysilicon, electrostatic motors, it will be recognized that the same principles are likewise applicable to micromotors fabricated with other surface micromachining techniques (e.g. with nickel as a structural material, to name but one), and relying on other actuation principles (e.g. electromagnetic).

Yet further, the illustrated embodiment made use of electroless plating to fill a mold on top of the rotor. In other embodiments, electroplating can be used for this purpose. In such other embodiments, a seed layer is first applied (as by sputtering or evaporation), and this layer is then used as the cathode in the electroplating process.

While the preferred embodiment made use of a micromotor rotor as a prime mover (i.e., the rotor directly moves an element that performs the ultimate work of a given assembly), the same principles can be used to achieve other ends. For example, a micromotor rotor can be provided with features such as mechanical actuator elements or a crown of vertically defined gear teeth that simply serve to drive further elements of an assembly (as opposed to performing the assembly's ultimate work).

Finally, while the foregoing description focused on the provision of mirrors on micromotor rotors, it will be recognized that a tremendous number of other features can likewise be fabricated. Optical shutters, gratings, mechanical actuators, and fluidic pumping elements are but a few of a lengthy catalog of such elements.

In view of the wide variety of embodiments to which the principles of our invention can be applied, it should be apparent that the detailed embodiments are illustrative only and should not be taken as limiting the scope of our invention. Rather, we claim as our invention all such modifications as may come within the scope and spirit of the following claims and equivalents thereto.

We claim:

1. In a method of fabricating a surface micromachined micromotor having a rotor and a stator, the rotor being fabricated in-place and thereafter freed, an improvement comprising:

fabricating the motor with a plurality of component layers, one of said layers being a topmost layer most remote from a substrate, another of said layers being an intermediate layer disposed between the topmost layer and the substrate; and forming a utilitarian feature on said rotor, said intermediate layer comprising said rotor;

wherein the utilitarian feature extends from said intermediate layer, away from said substrate and beyond the topmost layer.

2. The method of claim 1 wherein said utilitarian feature includes an optical shutter element.

3. The method of claim 1 wherein said utilitarian feature is a crown of gear teeth.

4. The method of claim 1 wherein said utilitarian feature is a mirror.

5. The method of claim 1 which includes fabricating the rotor to have a diameter of at least 500 micrometers.

6. A method of fabricating a salient-pole micromotor according to claim 1.

7. The method of claim 6 which thereafter includes operating said micromotor at a rotor speed in excess of 2000 revolutions per minute.

8. A method of fabricating a wobble micromotor according to claim 1.

9. The method of claim 8 which thereafter includes operating said micromotor at a rotor speed in excess of 75 revolutions per minute.

10. The method of claim 1 wherein said utilitarian feature is a prime mover.

11. The method of claim 1 which includes pretreating the intermediate layer prior to forming the utilitarian feature thereon, said pretreating including acid etching.

12. The method of claim 1 which includes defining the utilitarian feature by a process that includes x-ray lithography.

13. In a method of fabricating a surface micromachined micromotor having a rotor and a stator, the rotor being fabricated in-place and thereafter freed, an improvement comprising:

fabricating the motor with a plurality of component layers, one of said layers being a topmost layer most remote from a substrate, another of said layers being an intermediate layer disposed between the topmost layer and the substrate; and forming a fluidic pumping element on said rotor, said intermediate layer comprising said rotor;

wherein the fluidic pumping element extends from said intermediate layer, away from said substrate and beyond the topmost layer.

14. The method of claim 13 which includes fabricating the rotor to have a diameter of at least 500 microns.

15. In a method of fabricating a surface micromachined micromotor having a rotor and a stator, the rotor serving to rotate a prime mover associated therewith, an improvement wherein the rotor has a diameter of at least 200 microns, and the method includes defining the prime mover to extend outside a plane defined by said rotor.

16. The method of claim 15 in which the prime mover is a fluidic pumping element.

17. The method of claim 15 in which the prime mover is an optical shutter element.

18. The method of claim 15 in which the prime mover is a mirror.

19. The method of claim 15 in which the rotor has a diameter of at least 1000 microns.

* * * * *